United States Patent [19]

Greenblatt

[11] Patent Number: 4,922,439

[45] Date of Patent: May 1, 1990

[54] OPERATIONAL SYSTEM FOR TRAVEL AGENTS

[76] Inventor: Nathan Greenblatt, Vacations International Inc., 1112 Ave. V, Brooklyn, N.Y. 11223

[21] Appl. No.: 281,967

[22] Filed: Nov. 30, 1988

Related U.S. Application Data

[63] Continuation of Ser. No. 51,613, May 20, 1987, abandoned.

[51] Int. Cl.⁵ .............................................. G06F 15/26
[52] U.S. Cl. ..................................... 364/407; 364/401
[58] Field of Search .............................. 364/407, 401

[56] References Cited

U.S. PATENT DOCUMENTS

| | | | |
|---|---|---|---|
| 3,688,276 | 8/1972 | Quinn | 364/200 |
| 3,757,037 | 9/1973 | Bialek | 364/900 |

OTHER PUBLICATIONS

"Seats: An Expert System To Manage Airline Passenger Discounts", Bob Wilson.
"Airline Seat Management", Kraft et al., Logistics and Transportation Review, vol. 22, No. 2, pp. 115–130.
"Gus, A Frame-Driven Dialog System", Bobrow et al., Artificial Intelligence 8, 1977, pp. 155–173.
"Airline Management Information System at Arkia Israeli Airlines", Borovits et al., Airline Information System, MIS, Quarterly, Mar. 1988, pp. 127–137.
OAG Electronic Edition, Dialog Information Inc., Jan. 1986.

Primary Examiner—Allen MacDonald
Assistant Examiner—Gail O. Hayes
Attorney, Agent, or Firm—Lewis H. Eslinger; Jay H. Maioli

[57] ABSTRACT

An operational system for travel agents provides visual access to travel-related information without the necessity for the travel agent to have previously memorized any information or any access codes or the like. Travel related data is entered into a computer memory, for example, using a predetermined code number system and a keyboard is provided that has initially printed thereon titles of generic information, such as geographical regions, for example. Upon displaying the selected generic information, retrieval code numbers are displayed so that the operator can display more specific data by a sequential code number build up, thereby providing a full range of information down to minor details without requiring the user to memorize any code numbers or specific information.

7 Claims, 7 Drawing Sheets

FIG. 1

| 1 | 2 | 3 | 4 | 5 | 6 | 7 | 8 | 9 |
|---|---|---|---|---|---|---|---|---|
| USA CANADA | MEXICO CARIB-BEAN | CENTRAL SOUTH AMERICA | ORIENT ASIA | AUSTRALIA SOUTH PACIFIC | EUROPE | MIDDLE EAST | AFRICA | CRUISES OF THE WORLD |

| A DESTINATION | B TOUR DATES | C TYPE OF TOUR | D DURATION | E CLASS |
|---|---|---|---|---|
| = ITEM CODE # +1 | JANUARY 1 | INDEPENDENT 1 | 1-6 DAYS 1 | DELUXE 1 |
| = ITEM CODE # +2 | FEBRUARY 2 | HOSTED 2 | 7-11 DAYS 2 | FIRST 2 |
| = ITEM CODE # +3 | MARCH 3 | ESCORTED 3 | 12-18 DAYS 3 | BUDGET 3 |
| ETC | ETC | ETC | ETC | ETC |

| TOUR INFORMATION LISTING | 1 |
|---|---|
| TOUR INFORMATION LISTING | 2 |
| TOUR INFORMATION LISTING | 3 |
| TOUR INFORMATION LISTING | 4 |
| TOUR INFORMATION LISTING | ETC |

| TOUR RATE INCLUDES | DEPARTURE DATES AND COST |
|---|---|
| TOUR HIGHLIGHTS | ADD ON FARE |

FIG. 2

| A | | |
|---|---|---|
| ALASKA | 13 | |
| ARIZONA | 14 | |
| CALIFORNIA | 15 | |
| COLORADO | 16 | |
| FLORIDA | 17 | |
| HAWAII | 18 | |

| USA - CANADA TOURS | | |
|---|---|---|
| LOUISIANA | 19 | |
| MASSACHUSETTS | 111 | |
| NEVADA | 112 | |
| NEW JERSEY | 113 | |
| NEW YORK | 114 | |
| PENNSYLVANIA | 115 | |
| RHODE ISLAND | 116 | |
| VERMONT | 117 | |
| VIRGINIA | 118 | |
| WASHINGTON DC | 119 | |
| EASTERN CANADA | 121 | |
| WESTERN CANADA | 122 | |

| REGIONAL TOURS | | |
|---|---|---|
| THE WEST | 123 | |
| THE NORTHWEST | 124 | |
| THE NORTHEAST | 125 | |
| THE SOUTH | 126 | |
| CROSS USA | 127 | |
| CROSS CANADA | 128 | |

| B | TOUR MONTHS | |
|---|---|---|
| JAN | 1 | |
| FEB | 2 | |
| MAR | 3 | |
| APR | 4 | |
| MAY | 5 | |
| JUN | 6 | |
| JUL | 7 | |
| AUG | 8 | |
| SEP | 9 | |
| OCT | 10 | |
| NOV | 20 | |
| DEC | 30 | |

| C TYPE OF TOUR | |
|---|---|
| INDEPENDENT | 1 |
| HOSTED | 2 |
| ESCORTED | 3 |

| D DURATION | |
|---|---|
| 1-6 DAYS | 1 |
| 7-11 DAYS | 2 |
| 12-18 DAYS | 3 |
| 19- LONGER | 4 |

| E CLASS | |
|---|---|
| DELUXE | 1 |
| FIRST | 2 |
| BUDGET | 3 |

FIG. 3

JAN 1987 7-11 DAYS DELUXE HOSTED TOURS OF FLORIDA, LAND ONLY PER PERSON

| DAYS | GATEWAY | VISITING DESTINATIONS | $ FROM | OPERATOR | TOUR # |
|---|---|---|---|---|---|
| 8 | MIAMI | MIAMI BEACH | $ 415 | VAC. INT'L | 1712211 |
| 8 | PALM BEACH | PALM BEACH | $ 415 | VAC. INT'L | 1712212 |
| 8 | LAUDERDALE | FORT LAUDERDALE | $ 415 | VAC. INT'L | 1712213 |
| 8 | ORLANDO | ORLANDO | $ 415 | VAC. INT'L | 1712214 |
| 8 | TAMPA | ST. PETERSBURG | $ 415 | VAC. INT'L | 1712215 |
| 8 | ORLANDO | DATONA BEACH | $ 415 | VAC. INT'L | 1712216 |
| 11 | MIAMI | MIAMI BEACH (7), ORLANDO (3) | $ 615 | VAC. INT'L | 1712217 |
| 11 | MIAMI | MIAMI BEACH (7), NASSAU CRUISE (3) | $ 730 | VAC. INT'L | 1712218 |
| 11 | MIAMI | MIAMI BEACH (5), MEXICO CRUISE (5) | $ 850 | VAC. INT'L | 1712219 |
| 11 | MIAMI | MIAMI BEACH (3), CARIB. CRUISE (7) | $ 1175 | VAC. INT'L | 17122 110 |
| 10 | ORLANDO | ORLANDO (6), NASSAU CRUISE (3) | $ 765 | VAC. INT'L | 17122 111 |
| 11 | ORLANDO | ORLANDO (3), CARIB. CRUISE (7) | $ 1165 | VAC. INT'L | 17122 112 |
| 11 | TAMPA | ST. PETE (7), NASSAU CRUISE (3) | $ 730 | VAC. INT'L | 17122 113 |
| 11 | TAMPA | ST. PETE (3), CARIB. CRUISE (7) | $ 1175 | VAC. INT'L | 17122 114 |
| 11 | MIAMI | FLORIDA GRAND TOUR | $ 650 | VAC. INT'L | 17122 115 |

FIG. 4

JAN 1987 8 DAY DELUXE HOSTED TOUR OF MIAMI BEACH, LAND ONLY PER PERSON

| TOUR RATE INCLUDES | TOUR HIGHLIGHTS - HOTELS | DEPART | DOUBLE | RES # |
|---|---|---|---|---|
| PACKAGE A: | HOTELS USED | JAN 6 | $415 | 17122111 |
| * ROUND TRIP TRANSFERS | * FONTAINEBLEAU HILTON | JAN 11 | $415 | 17122112 |
| * LUGGAGE HANDLING | * SHERATON BAL HARBOUR | JAN 13 | $415 | 17122113 |
| * DELUXE HOTELS | * DORAL | JAN 18 | $415 | 17122114 |
| * SIGHTSEEING | * EDEN ROCK | JAN 20 | $455 | 17122115 |
| * DINNER SHOW | OPTIONAL ATTRACTIONS | JAN 25 | $455 | 17122116 |
| * HOSTESS SERVICES | * MIAMI SEAQUARIUM | JAN 27 | $455 | 17122118 |
| OR | * PLANET OCEAN | | | |
| | * PLANITARIUM | SINGLE SUPPLEMENT | | $375 |
| PACKAGE B | * VIZCAYA GARDENS | TRIPLE ROOM DEDUCT | | $42 |
| * DELUXE HOTELS | * FAIRCHILD TROPICAL GARDEN | | | |
| * 7 DAYS CAR RENTAL | * PARROT JUNGLE | AIRFARE | | |
| * CELEBRITY SHOW | * ORCHID JUNGLE | | | |
| * HOSTESS SERVICES | * METRO ZOO | N.Y. $195 | DETROIT | $210 |
| | * MONKEY JUNGLE | BOSTON $250 | WASH. DC | $195 |
| | * NIKKO CRUISES | CHICAGO $210 | PHILA | $195 |
| | * SEAESCAPE | * SUN. DEPARTURES ADD | | $40 |
| | * MICCOSUKEE INDIAN VILLAGE | | | |

OPERATIONAL SYSTEM FOR TRAVEL AGENTS

This is a continuation of application Ser. No. 07/051,613, filed 5-20-87 now abandoned.

BACKGROUND OF THE INVENTION

1. Field of the Invention

This invention relates generally to a system and method for use in displaying complex detailed data without the foreknowledge of any indexing system and, more particularly, to an operational system and method for use by travel agents.

2. Description of the Background

Although modern data processing equipment provides a great facility to store information, that very same ability provides a concomitant difficulty relating to retrieval of that information. Generally, some index must be memorized or specific coding system may available in order to retrieve detailed information that has been input into a memory medium, such as a computing system. For this reason, the generally available data processing equipment has not proven suitable for all possible applications. For example, in the travel business, there is a vast amount of information that is generally not compiled but it set forth in individual pamphlets, brochures, schedules, rate sheets, and the like. Therefore, a travel agent must be a person of high skill and great knowledge concerning all of these various informational pieces, since in order to properly advise the client, the travel agent must present a realistic number of choices that are selected from only the appropriate information. That is, travel, accommodations, and tours, and the like, must all be closely interrelated in order to permit the client to optimize his selection.

Therefore, the situation exists in which certain industries, one of which is the travel industry, can not adequately avail themselves of the technological advances presently available and, furthermore, in areas such as the travel field the personal expertise required of the individual agents becomes a burden in providing adequate travel agent coverage to the overall population.

OBJECTS AND SUMMARY OF THE INVENTION

Accordingly, it is an object of the present invention to provide an operational system for travel agents that can eliminate the above-noted defects inherent in the prior art.

Another object of the present invention is to provide a system for providing travel-related information to a user that does not require the user to be in possession of a large number of pamphlets, charts, rate schedules, and the like in order to formulate acceptable travel plans.

A further object of this invention is to provide a method for providing travel-related information to a user who is not required to memorize retrieval numbers or indexes or the like.

In accordance with one aspect of the present invention, travel related information is placed in a conventional data processing storage medium, such as the memory found in a microcomputer, and by using a sequential code number system in which the code numbers are built up starting from generic information to more specific information. Once this information is in the storage medium, the user can then utilize a keyboard that has labels thereon indicating the generic information that is available, whereby the user can obtain a visual display or screen of the selected generic information and using the appropriate retrieval code numbers can by a process of sequential code number build-up proceed to the more specific data that is desired.

The above and other objects, features, and advantages of the present invention will become apparent from the following detailed description of illustrative embodiments thereof to be read in conjunction with the accompanying drawings.

DETAILED DESCRIPTION OF PREFERRED EMBODIMENTS

The present invention provides an operational system and method to retrieve complex and detailed information utilizing a single multiple-choice menu display. This display includes both descriptive words of the various data lists that are available and also the corresponding reference code words. Access to this multiple choice menu, that is, the manner in which the various kinds of generic information can be called up may be obtained through a keyboard that is provided with the appropriate legends adjacent the corresponding keys. This keyboard will be explained in further detail hereinbelow. Thus, by keying in the appropriate reference codes, which as will be seen are part of a sequential code number build up system, the user can obtain specific informatiion without having to memorize any lists of code words or the like. In addition, no complex reference manuals, prior inherent knowledge, nor any detailed training is required of the user.

Figure 1:
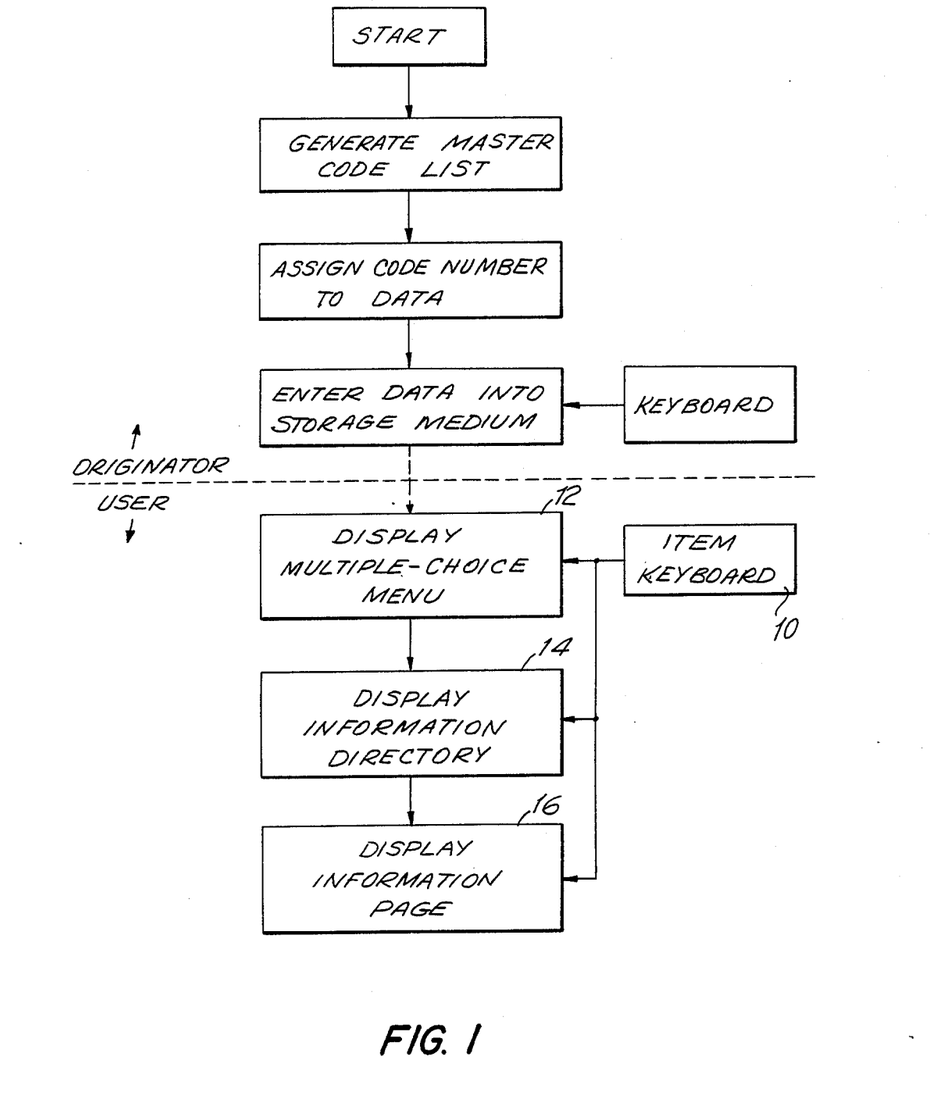
FIG. 1 is a flow chart representing data input and data output according to the present invention.
Figure 2:
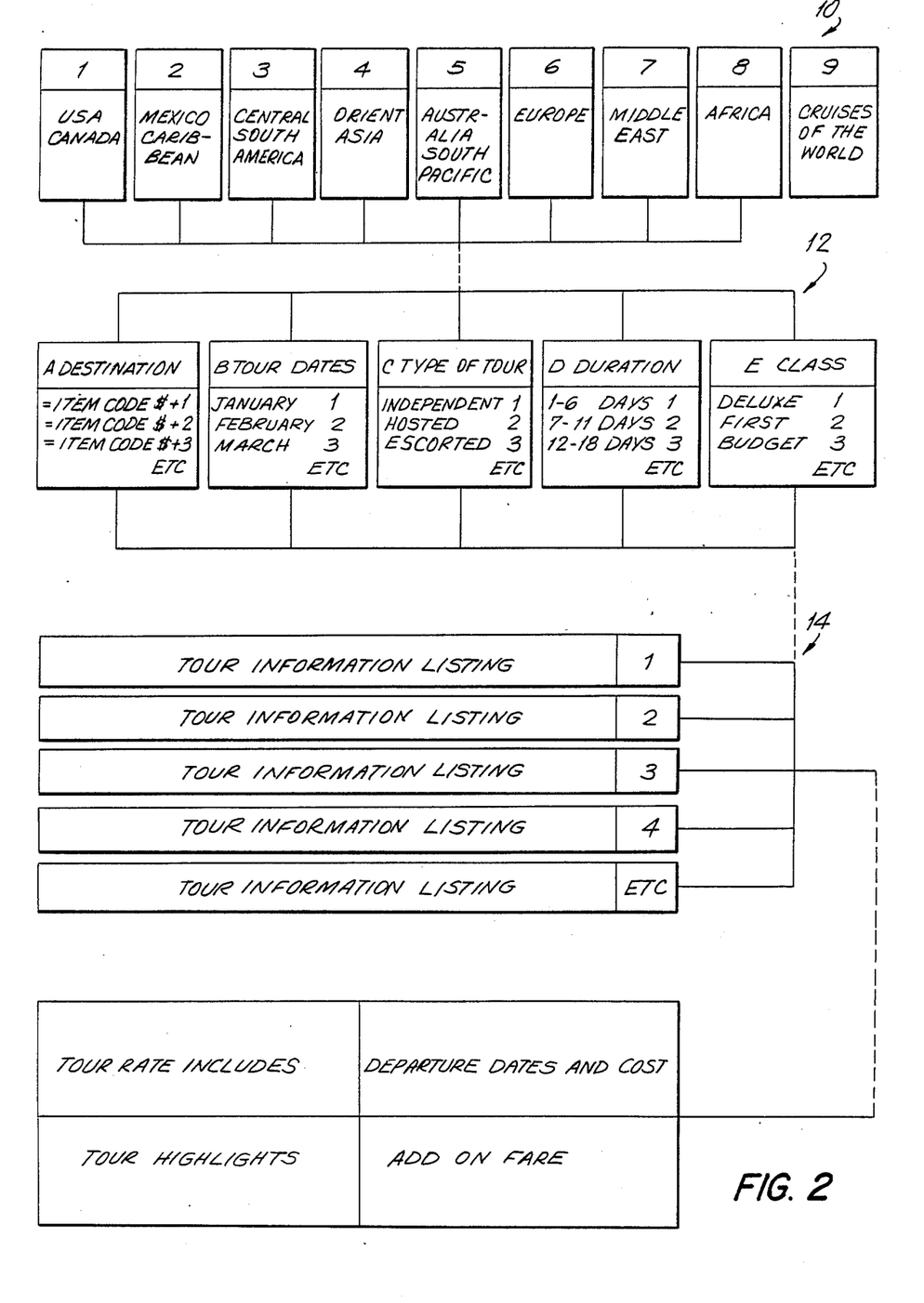
FIG. 2 is a representation of information that can be displayed according to an embodiment of the present invention.

Referring to FIG. 1, the portion of the present invention that is employed by the user is diagrammatically represented below the dashed line. More particularly, the item keyboard 10 includes a plurality of keys just as a conventional typewriter keyboard, however, specific legends are arranged in relation to designated keys to obtain specific generic information that can be displayed as a multiple choice menu. As seen in FIG. 2, this keyboard 10 then sets forth the subject matter for which information can be obtained. Each of the specific items of information is assigned a sequential code number, such as 1, 2, 3 . . . , with the appropriate word being arranged adjacent the respective key. When a key is depressed the corresponding menu will appear on the video monitor. The various keys may bear the legends as represented at 10 in FIG. 2.

Upon pressing a key on the item keyboard 10 a multiple choice menu 12 will be displayed. This multiple choice menu 12 contains a plurality of required information categories that are divided into sequential groups with each group containing the desired information. Once again, each of the various informational items is assigned a sequential code number, and the multiple choice menu is represented generally at 12 in FIG. 2. Thus, exemplary titles for the multiple choice memory are seen to be the destination, the tour date, the type of tour, the duration of the tour, and the class of accommodations. These are only samples and other more specific choices could be provided.

Therefore, once the user of the system has displayed that multiple choice menu he then presses the appropriate key of keyboard 10 to provide even more specific information, that is, the information directory 14 in FIGS. 1 and 2. This information directory is a listing that is assigned to include all essential information in detail to permit the user to reliably and efficiently obtain the necessary information of the proposed travel. Once again, the items in this specific tour information directory all contain their own individual numbers permitting further call up if desired. Finally, there is possible to provide a selected information page which contains detailed information of the subject matter that has been selected from the information directory and this is represented generally at 16 in FIG. 1.

In the sequential code number build-up system, the item code number is started with first, and this is similar to the area code number in a telephone system, and its main function is to create groups of different retrieval code numbers. Each retrieval code number then consists of a set of sequential code numbers that are derived from the multiple choice menu. Therefore, the user then builds an arbitrary number by selecting and assembling various code numbers from the information displayed to him. This being the case, the instant invention is not necessarily limited to the travel field but has applications in any other areas that require an assembly of items from a large array of information.

In order to further represent the capabilities of the instant invention, attention is directed to FIG. 2, which represents the item keyboard at 10 and in a travel agency embodiment this displays the geopolitical divisions of the world in a row of keys, each key being assigned a sequential number. Thus, to start the tour information retrieval process, the user depresses the desired location that will then display the appropriate tour multiple-choice menu on the video monitor.

Figure 3:
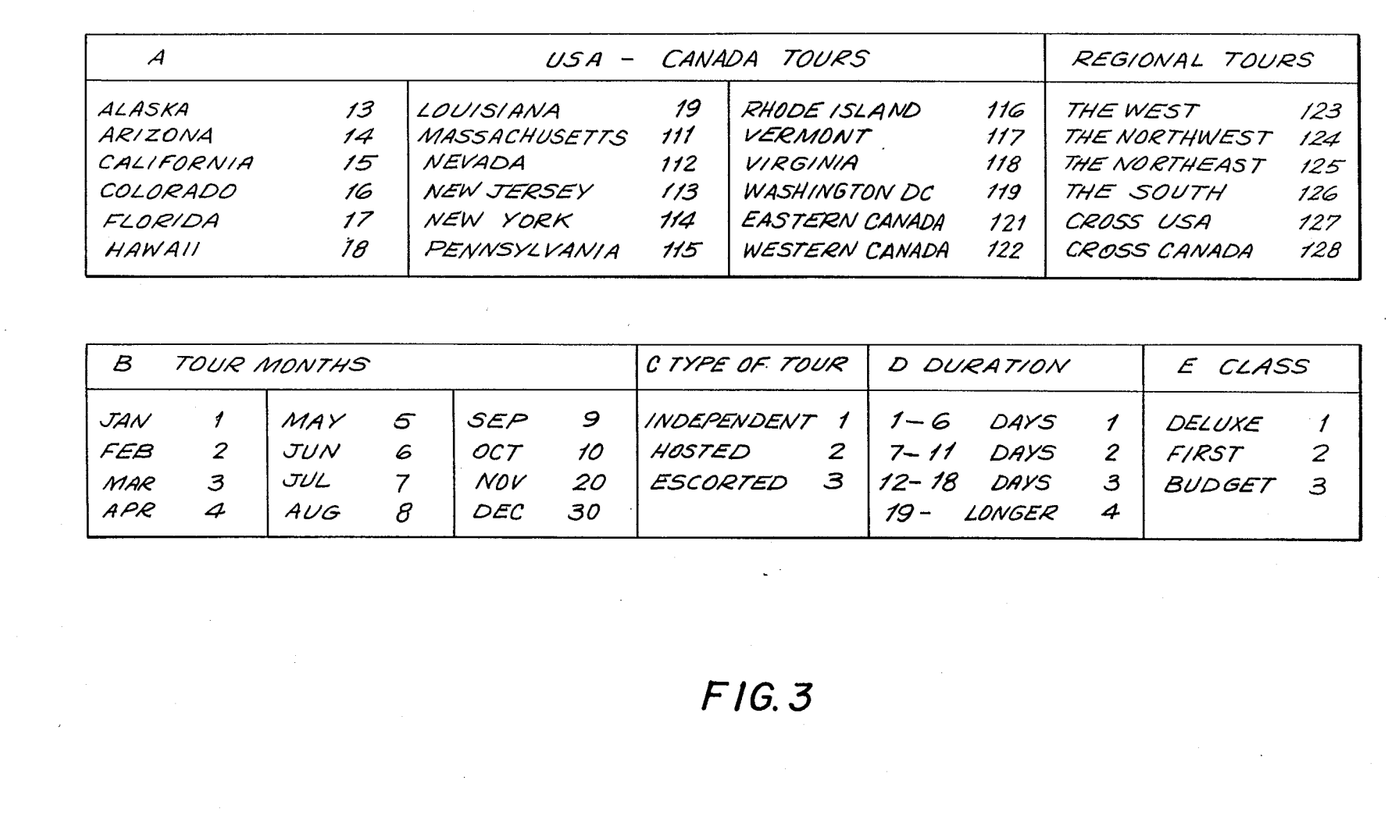
FIG. 3 is a representation of more specific information that can be obtained utilizing the display of FIG. 2.

Assuming then that key number 1 was depressed, a display such as seen in FIG. 3 would typically be provided. This display corresponds to the multiple choice menu 12 of FIGS. 1 and 2. More particularly, by pressing key number 1 of the item keyboard various destinations in the United States and Canada are displayed. Note that adjacent each destination is a specific code number that forms the designation for that specific destination. Use of this tour item code number will preserve the specific geographic identity of this group throughout the entire retrieval process. Note that these destinations are purely arbitrary and, in some cases, there will be more destinations, while in other cases less, depending upon requirements of the system user.

In regard to the tour dates, this is typically divided into the twelve months of the year with the appropriate retrieval code numbers being assigned thereto. A finer division could be provided in the form of weeks or days, however, generally speaking a monthly tour date is adequate.

The different types of tours are generally set forth and in this example, these can be independent, hosted, escorted and the like, with the appropriate sequential numbers again being assigned thereto. Additional kinds of tours might include bus tours, rail tours, rent-a-car tours, and the like.

The duration of the tours are arbitrary periods and each segment is assigned a sequential code number once again, starting with 1 and continuing up to the number of durations provided in that informational block. Similarly, the class of service of the tour is also provided with its own sequential code numbers.

To assemble a tour retrieval number, the user has only to select one code number from each of categories A, B, C, D, and E and enter that number using the keyboard, which is provided in the overall microcomputer, for example. Upon keying in these numbers and depressing the "enter" key, for example, the appropriate tour information directory will appear on the monitor screen. Thus, it is seen that the user can retrieve tour information based on specific need, for example, a seven-day escorted deluxe tour to Florida during the month of January can be keyed in to produce the appropriate tour information with lists of tours to choose from.

Figure 4:
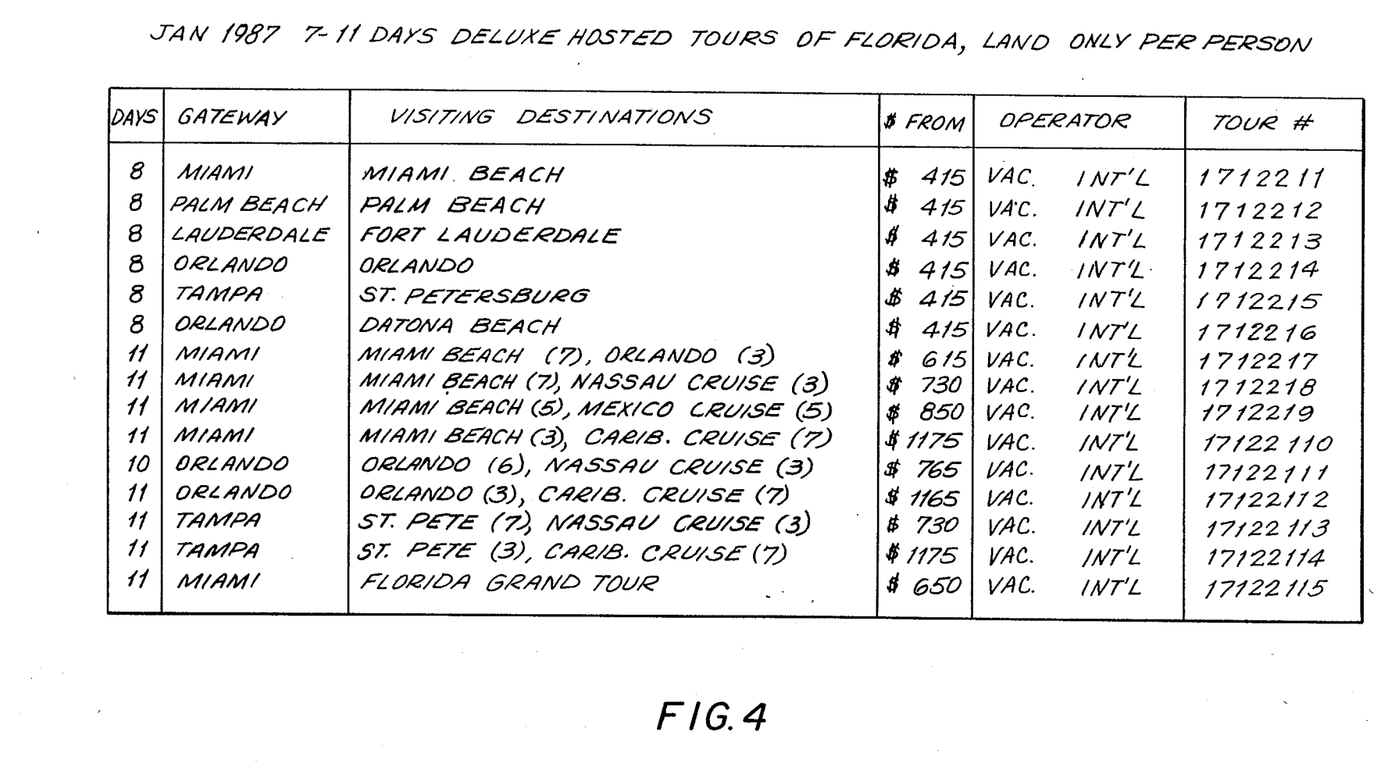
FIG. 4 is a representation of still more specific information that can be obtained utilizing the representation of FIG. 3.

In that regard, attention is directed to FIG. 4 which shows a representation of information that would be provided to the user who, indeed, had keyed in just that very tour. More specifically, the listing format includes all essential details necessary to enable the user to select the desired tour and, once again, each tour may be seen as having a number set forth in the right-hand column that when combined with the tour retrieval code number forms the tour number.

Figure 5:
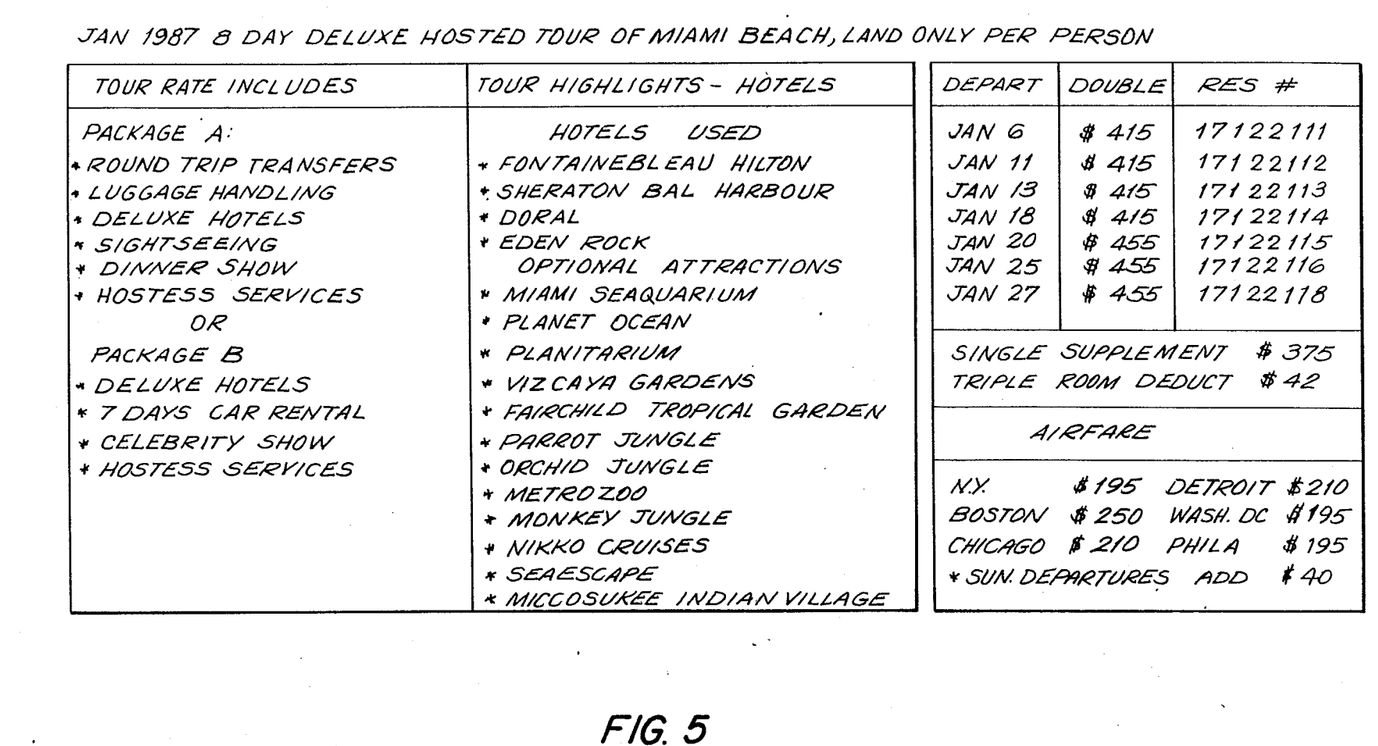
FIG. 5 is a representation of yet still more specific information that can be obtained utilizing the representation of FIG. 4.

Finally, attention is directed to FIG. 5, which represents the last display of the sequential number build up system, and this display sets forth the complete information for each selected tour, such as the departure date, cost of the tour, what is included in the tour, the highlights of the tour, supplemental charges, options, reservations, and so on. Here again each departure date may be seen as having a number set forth in the right hand column that when combined with the selected tour number from FIG. 4 form the reservation number.

Figure 6:
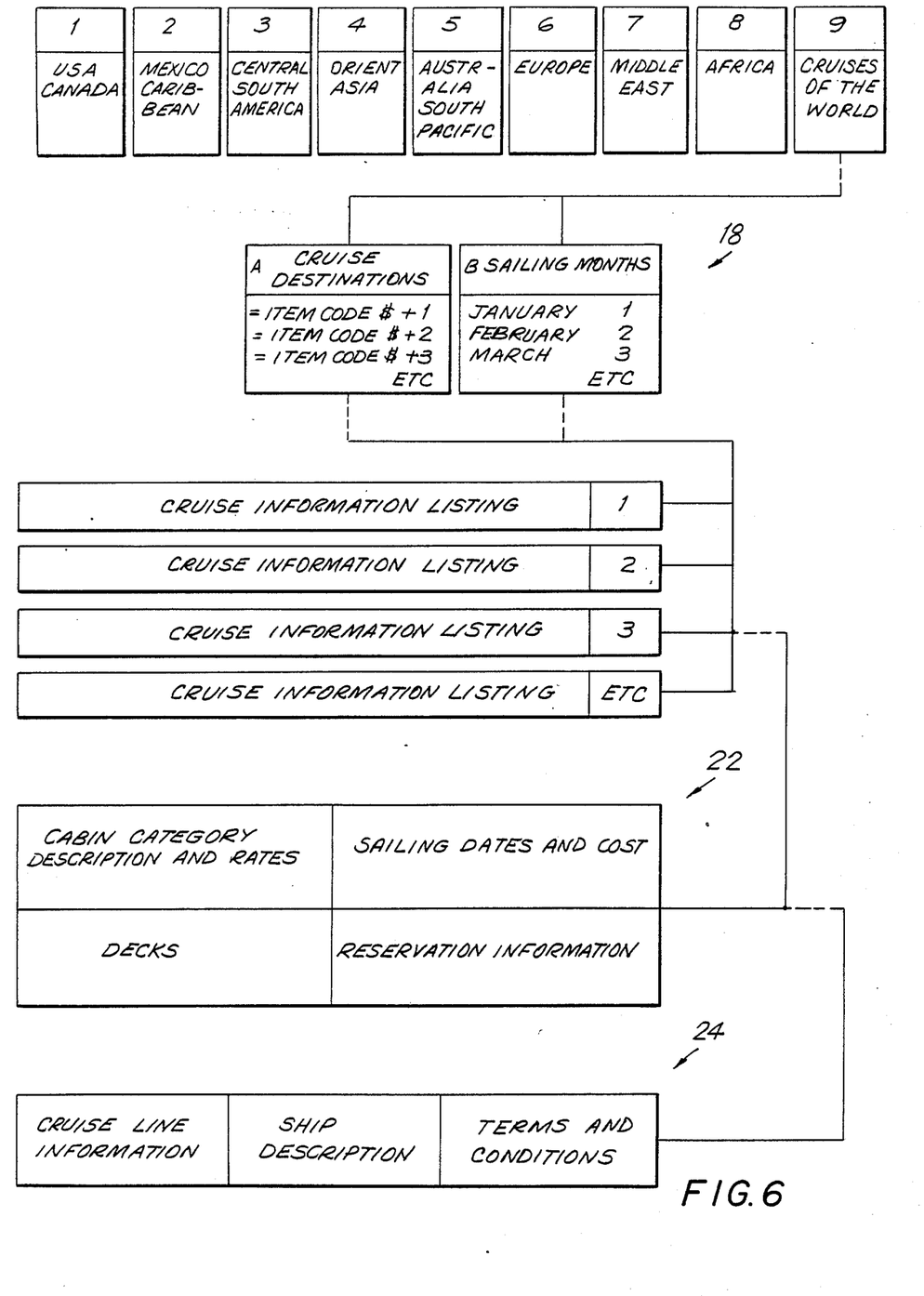
FIG. 6 is a representation of generic information that can be obtained according to another embodiment of the present invention.

FIG. 6 represents a retrieval diagram similar to FIG. 2 except that in this situation, the cruises of the world key number 9 of the item keyboard 10 is selected. Accordingly, information particular to cruise tours is provided. Again, all such information is provided with the retrieval code numbers located adjacent the information so that the sequential code number can be built-up by the user without memorizing a code list.

Figure 7:
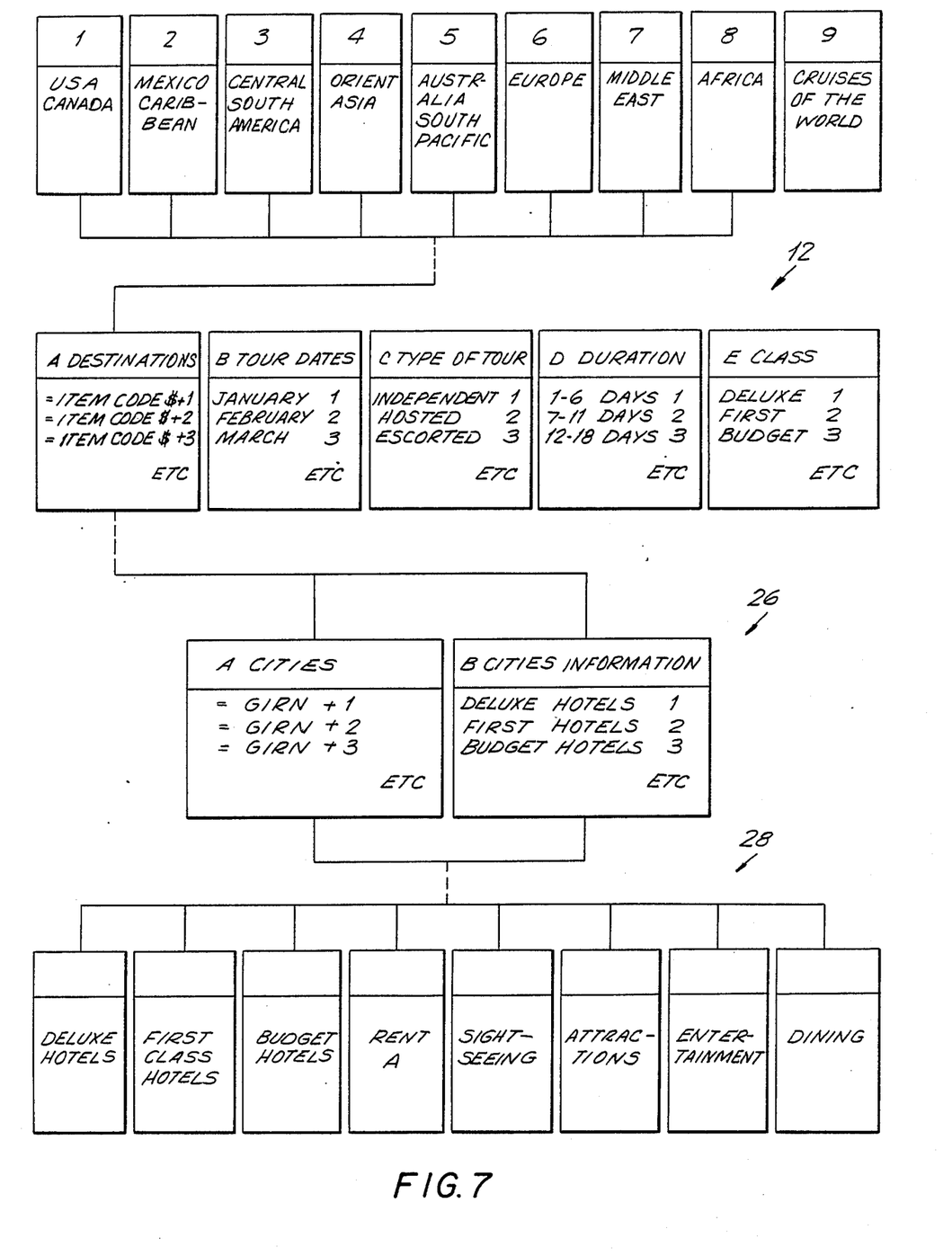
FIG. 7 is a representation of generic information that can be obtained according to still another embodiment of the present invention.

Similarly, FIG. 7 represents a general information system similar to that of FIG. 2 except that in lieu of the tour information, more information is set forth regarding the specific destinations so that an individual tour can be generated in place of a package tour.

Referring back then to FIG. 6, in regard to the cruise information, upon depressing item key number 9, the cruise information retrieval process will be started to place the cruise multiple choice menu on the computer screen. As seen at 18 in FIG. 6, this provides information concerning the destination and the cruise sailing date, with each particular item being provided with its own sequential code number. To assemble a cruise retrieval code number then, the user selects a code number from the destination and one from the sailing month, which then is entered using the keyboard and causes the appropriate cruise information directory to appear on the monitor screen. The cruise information directory 20 then lists the central details necessary to permit the user to select a desired cruise. Again, each cruise in the directory is assigned a sequential number that will be combined with the cruise retrieval code number to form the cruise reservation number. In this cruise reservation system, the cruise reservation page 22 in FIG. 6 will provide complete information on the selected cruise, such as the sailing date, the category and description of the cabins, the decks, the cost of the cruise, supplemental charges and the like. Similarly, the ship and cruise information will also provide further terms and conditions of the sailing.

In order to obtain the general information system, as seen for example in FIG. 7, it is necessary only to add a o in front of the number combination that consists of the tour item code number and the destinatiion code number. Then by completing the keying in of the general information code number, the general information multiple choice menu will appear on the computer monitor screen. For example, as seen at 26 in FIG. 7, general information concerning the cities that are within the selected destination is provided. Each city is assigned a sequential code number with the general information retrieval number (GIRN) preceding it. It should be noted that this general information item code number can be used to maintain the specific destination identity of the group throughout the entire retrieval process. Also available is further information 28 concerning the cities that may relate to hotels, rent-a-car, sightseeing attractions, entertainment, and dining, and the like. Again each of these sub-designations will be assigned a sequential code number for use in calling up further information, as represented as 28 in FIG. 7.

From the foregoing, it is seen that according to the present invention a sequential code number build-up method that form groups of retrieval code numbers is provided. Each number in the group represents a specific reference piece of information and by employing the initially provided multiple-choice menu, the user can form a limitless number of retrieval code numbers, each of which represents a different informational listing index. Furthermore, the numerical build-up can be extended to include additional pages of information that are related to the initial retrieval code number by adding further code numbers to each of the newly formed retrieval code numbers. The initial item code number is identified on the keyboard by its legend printed next to it that serves as an identifying code word that eliminates any possibility of retrieval code number duplications or mix-up on the part of the operator. The multiple-choice menus all contain all reference material necessary to permit the user to select the appropriate retrieval code numbers, thereby eliminating the requirement for look-up tables or to memorize various code numbers.

While the forgoing has been describing a method of extracting information from the system, attention is now directed back to FIG. 1 at the portion above the dashed line therein, which relates to entering the information by the originator into the appropriate storage medium, such as a computer memory, tape, floppy disc or the like. More particularly, a master code list is irst generated which then is used to classify various kinds of information that will be subsequently provided on the multiple choice menu. Then the various pieces of data are assigned the appropriate code numbers and ultimately the actual data itself is entered using a keyboard into the storage medium with the specific address corresponding to the code number assigned thereto. This storage medium may then be provided to the user in the form of a complete computer system or in the form of a storage medium and then the user may then call up the information as indicated above utilizing the item keyboard, for example.

The above description is given on preferred embodiments of the invention, but it will be apparent that many modifications and variations could be effected by one skilled in the art without departing from the spirit or scope of the novel concepts of the invention, which should be determined by the appended claims.

What is claimed is:

1. A method of visually providing travel-related data in direct access fashion using a computer, a keyboard and a video display screen, comprising the steps of:

assembling a list of destinations;

assembling travel-related data of different generic components, including locales, dates, types of tours, durations, and classes of services relating to each of said destinations;

assembling specific data for each said generic component;

assigning an individual code number to each destination and to each different generic component of data;

assigning an individual code number to each piece of said specific data;

entering all of the destinations and the generic and specific data along with the respective code numbers into a storage medium of the computer;

displaying the generic components stored in said storage medium;

requesting specific data for the generic component relating to a selected destination from the storage medium using a respective one of said code numbers from the displayed generic components relating to destinations and the keyboard, and providing a visual display on the video display screen of a plurality of specific data categories related to the requested selected destination along with the respective code numbers;

selecting and assembling an information retrieval command number and requesting directly any number of specific data relating to the requested destination using the specific data code numbers and the keyboard; and displaying on the video screen the requested specific data.

2. The method of claim 1, in which the step of selecting and assembling an information retrieval command number includes forming the command number as a sequential build-up word with the numbers of the generic data forming the most significant digit of the word.

3. The method of claim 1, including the further step of providing written designation words adjacent selected keys of the keyboard for indicating respective ones of the different kinds of generic data.

4. The method of claim 3, in which the step of requesting data of one generic component includes depressing a key of the keyboard having a written designation adjacent thereto.

5. In a computer system having a storage medium, a keyboard, and a video monitor, a method for making available travel-related data, comprising the steps of:
assembling travel-related data;
dividing the assembled data units into different kinds of generic topics, including destinations, dates, types of tours, durations, and classes of service;
arranging the divided data in sequential form from generic to specific data;
assigning an individual code number to each different kind of generic data;
assigning an individual code number to each piece of specific data;
entering all of the generic and specific data into the storage medium using the keyboard;
displaying on the video monitor generic data relating to destinations stored in the storage medium;
requesting specific generic data relating to a selected destination by relating to the selected destination on the video display screen; and
simultaneously requesting any number of specific data by formulating an information retrieval command number made up of selected submenu code numbers using the keyboard, and displaying the specific data on the video display screen.

6. A method to according to claim 5, further comprising the step of providing an indication of the different kinds of generic data by placing printed labels on the keyboard adjacent respective keys setting forth the names of the different kinds of generic data.

7. An improved method of visually providing travel-related data using a computer, a keyboard, and a video display screen, comprising the steps of:
assembling different generic item groups, including at least a group of geographic destinations, a group of dates, a group of types of tours, a group of durations, and a group of classes of services;
assembling specific data for each said generic item group;
assigning an individual code number to each generic item group;
assigning an individual code number to each piece of specific data in each generic item group;
entering all of the generic item groups and specific data along with their respective code numbers into a storage medium of the computer;
selecting one destination from said geographic destination item group by using the corresponding code number and the keyboard and displaying a related multiple choice menu of specific data submenu codes relating to the selected destination on the video display screen; and
simultaneously requesting any number of specific data by formulating an information retrieval command number made up of selected submenu code numbers using the keyboard, and displaying the specific data on the video display screen.

* * * * *